Aug. 18, 1959    J. C. SETTLES    2,900,181
SPRING GROUP AND DAMPING MECHANISM
Filed March 4, 1954    2 Sheets-Sheet 2
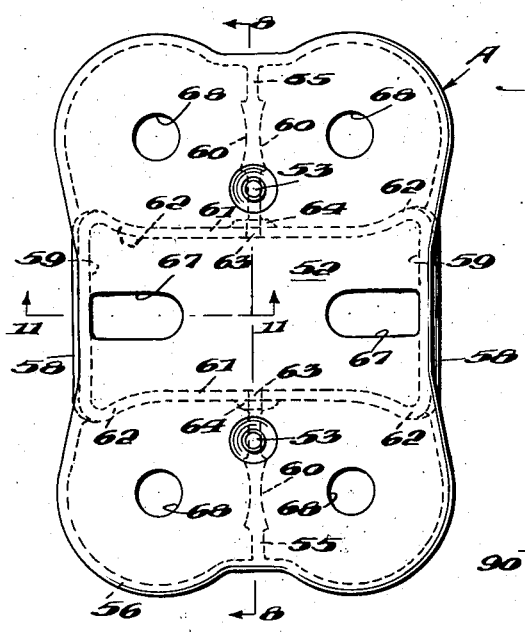
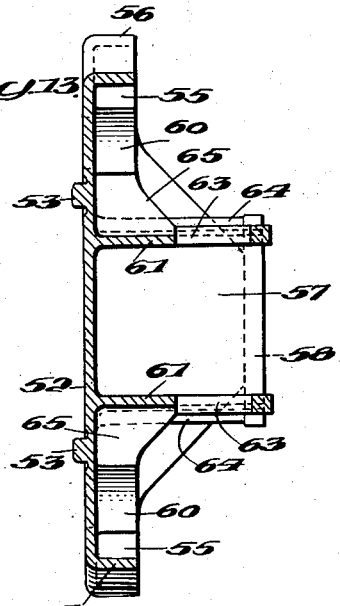
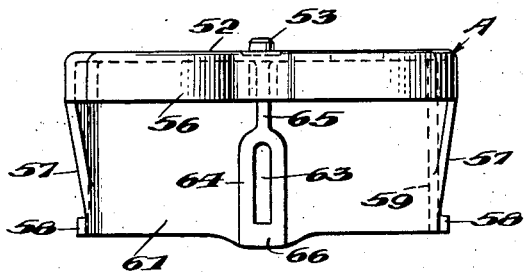
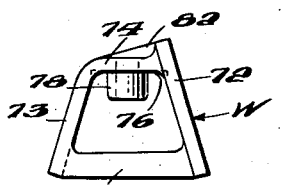
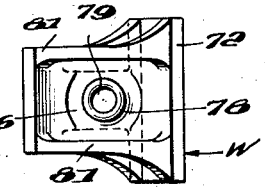
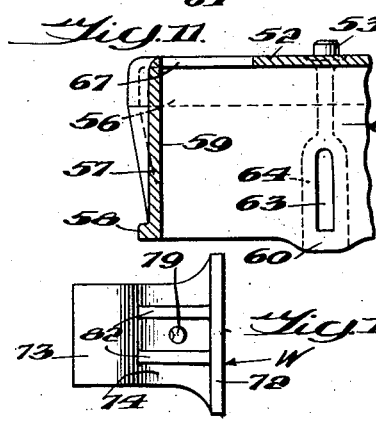
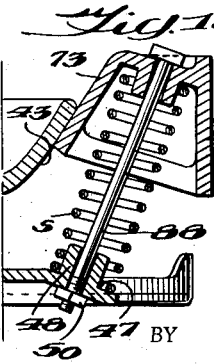
INVENTOR
JAMES C. SETTLES,
BY
ATTORNEY

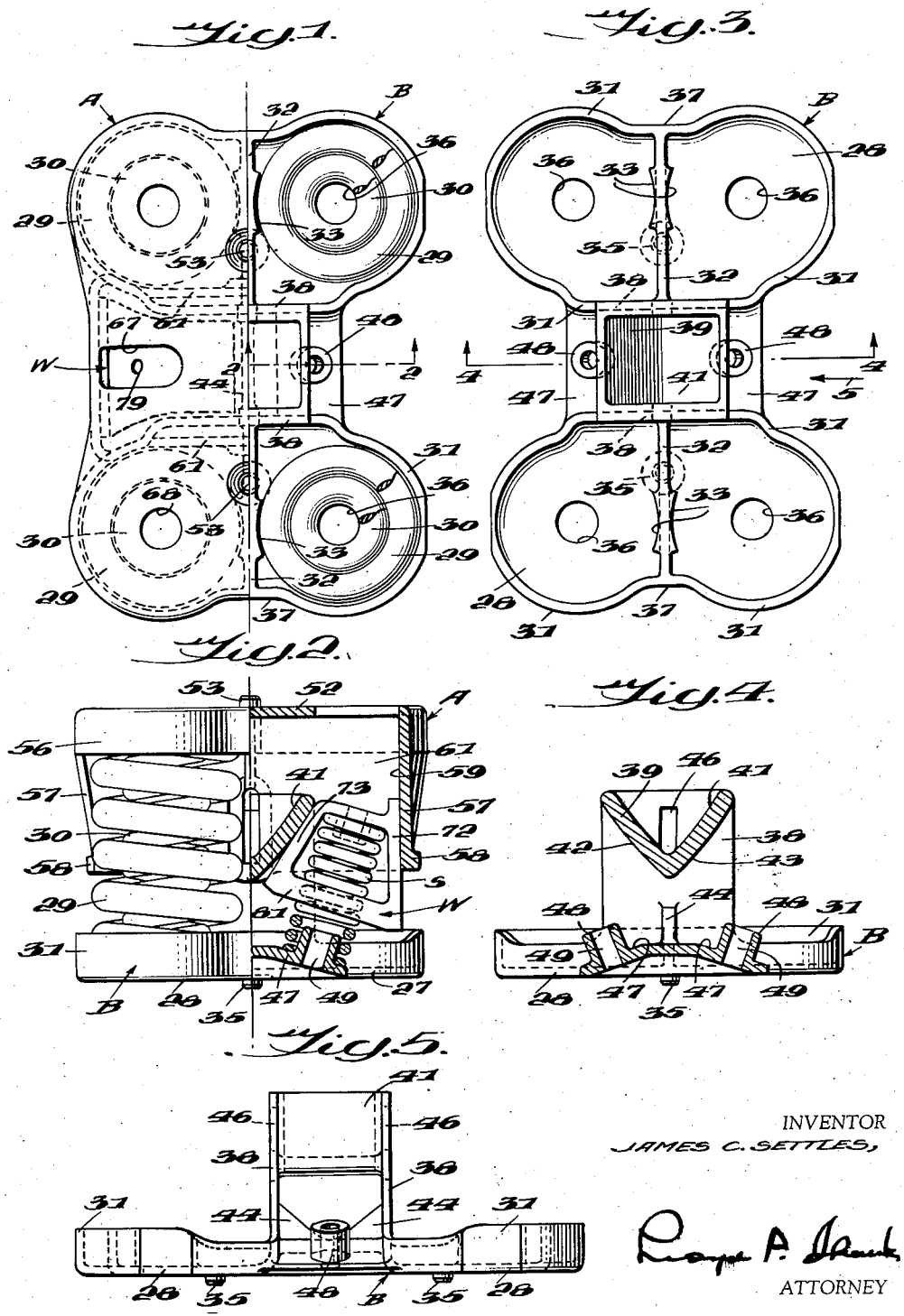

United States Patent Office 2,900,181
Patented Aug. 18, 1959

2,900,181

SPRING GROUP AND DAMPING MECHANISM

James C. Settles, Columbus, Ohio, assignor to The Buckeye Steel Castings Company, Columbus, Ohio Application March 4, 1954, Serial No. 414,078

9 Claims. (Cl. 267—9)

The present invention relates to a spring group for railway car trucks wherein a plurality of load supporting springs of the coil type are employed in association with a friction absorbing snubbing device to damp recoil actions of the springs which support the load carrying bolster of a car truck.

An object of the invention is to provide a spring group having damping control and forming a package unit possessing the necessary strength by reason of the design of the top and bottom members and by so distributing the material forming features of the damping mechanism as to avoid encroachment on the space available in a side frame of a railway car truck for accommodating the load supporting springs and to provide a snubbing mechanism of increased efficiency and to provide a device which may be readily assembled and dismantled.

A further object of the invention is to devise a package spring group and damping mechanism so constructed that the friction shoes or wedges have maximum facial engagement with the relatively moving parts of the device and to so position the wedge actuating springs that the resultant forces acting on the friction shoes efficiently damp relative movements of the top and bottom members of the device.

Other objects and features of the invention will be more apparent to those skilled in the railway art pertaining to the damping of the oscillation of the load springs upon consideration of the following detailed description and the accompanying drawings wherein an exemplary embodiment of the invention is disclosed.

In the drawings:

Fig. 1 is a top plan view of the spring group exhibiting the invention with a portion of the top member broken away and some of the elements of the damping mechanism removed to illustrate the construction of the bottom member.

Fig. 2 is an end elevational view of the package spring and damping unit with a portion illustrated in section on the line 2—2 of Fig. 1 and showing the right friction shoe and its actuating spring in position.

Fig. 3 is a plan view of the bottom member.

Fig. 4 is a transverse sectional view taken on the line 4—4 of Fig. 3.

Fig. 5 is a side elevational view of the bottom member taken in the direction of the arrow of the 5 in Fig. 3.

Fig. 6 is a plan view of the top member.

Fig. 7 is an end elevational view of the member shown in Fig. 6.

Fig. 8 is a sectional view taken on the line 8—8 of Fig. 6.

Fig. 9 is a side elevational view of one of the wedges.

Fig. 10 is an inverted plan view of the wedge shown in Fig. 9.

Fig. 11 is a sectional view of a portion of the top member taken on the line 11—11 of Fig. 6.

Fig. 12 is a fragmentary sectional view illustrating one scheme for retracting the wedge against the action of its spring.

Fig. 13 is a side elevational view of a bar employed for holding the members in an assembled relationship.

Fig. 14 is a plan view of the wedge.

A spring group and damping mechanism exhibiting the invention comprises a top member A and a bottom member B with load supporting springs interposed therebetween. At least one coil spring 29 is arranged at each corner of the device as shown in Fig. 1 and a further coil 30 may be positioned within certain or all of the helical springs 29 as load capacity requires. A friction damping mechanism of novel design for the spring group includes two wedges or friction shoes W which are accommodated in an intermediate portion of the device between the load supporting springs. The wedges are urged by springs S (one shown in Fig. 2) into frictional engagement with surfaces carried by the top and bottom members as hereinafter described to damp oscillations of the load supporting springs.

The bottom member B includes plate portions 28 having flat under surfaces for engaging the spring seat of a railway car truck or a spring plank. These plate portions carry depending lugs 35 adapted to enter spaced holes in the spring seat of a railway side frame truck or similarly spaced holes in a spring plank. A flange structure 31 principally of arcuate form extends upwardly from the plate portions 28. The load supporting springs 29, and 30 if desired, engage the upper surfaces of the plate portions 28 at their lower ends and the springs are retained in position by the flange structure 31. Apertures 36 are provided in the bottom member near the center of the load springs through which water or other extraneous matter escape. The flange structure 31 in addition to maintaining the lower end of the load supporting springs in proper positions on the bottom plate also serve to reinforce the bottom member. Upstanding ribs 32 also provide reinforcements of the bottom member and serve to prevent shifting of the lower ends of the springs. The ribs 32 are provided with concave surfaces 33 generated about vertical axes and these surfaces extend circumferentially along peripheral portions of the lower end of the load springs 29 as shown in Fig. 1 to assist in maintaining the springs in proper position on the bottom member. The outer surface of the flange structure 31 in the areas 37 is relatively flat to accommodate marking plates or the like.

The portions of the bottom member providing spring seats and pockets for the load supporting springs are joined by an intermediate portion of more narrow width than the end extremities of the bottom member. The intermediate portion carries structure providing parts of the damping mechanism and includes spaced walls 38 formed integral with the bottom member and extending upwardly therefrom. A V-shaped web structure including angularly related plates 39 and 41 extends horizontally between and joins the walls 38. The surfaces 42 and 43 of the V-shaped web structure are slightly convex and are adapted to be engaged by surfaces of wedges hereinafter described and the crown surfaces permit rocking of the wedges on the convex profile of the surfaces 42 and 43. The connections between the lower ends of the walls 38 with the bottom member B are reinforced by gusset ribs 44. The lower ends of the walls 38 also merge with the flange structure 31. Vertically elongated slots 46 are provided in the end walls 38 above the lower extremity of the V-shaped web structure for receiving a bar or the like as hereinafter described for holding parts of the mechanism in proper assembled relationship prior to use in a railway car truck. A pair of downwardly diverging spring seats 47 are provided intermediate the walls 38. Each spring seat carries a spring positioning lug 48 having a centrally located opening 49 therethrough as shown in Fig. 4.

A top member A for the device is best shown in Figs. 6 to 8 and 11 and is of general rectangular shape with the mid portion of greater width than the bottom member B to provide space for accommodating elements of the damping mechanism. The top member includes a plate 52 adapted to be engaged by the under surface of the bolster of a railway car truck and carries a plurality of upstanding lugs 53 for cooperation of properly spaced holes in the bottom of the bolster. Back fillets may be provided around the lugs 53 and around the lugs 35 on the bottom member.

A flange structure 56 depends from the top plate 52 around end perimeter portions which serves to position the upper ends of the load springs 29 and to reinforce the top member. The upper ends of the load springs are also maintained in proper positions by depending ribs 55 having concave faces 60. These ribs further reinforce the top member. The inner end of the ribs 55 are of greater depth as indicated at 65 in Fig. 8 and join mid portions of the walls 61. Throughout the central portion of the upper member and in the region of the damping mechanism the flange structure is deepened and extends downwardly to a greater extent than the flange structure 56 around ends of the device. The enlarged portions of the flange structure are indicated at 57 and the lower portions are reinforced by ribs 58. The flanges 57 are provided with vertical inner surfaces 59 (Figs. 2 and 11) against which a face of each damping wedge is adapted to frictionally engage. The top member A transversely of the central portion carries generally parallel depending walls 61 which are formed integral with the top plate 52 and join the deepened flange portions 57. The walls 61 curve outwardly from each other at 62 so as to provide an enlarged area adjacent the vertical surfaces 59 and thereby increase the facial engagement of the wedges with the top member as hereinafter described.

The walls 61 are each provided with a vertically elongated slot 63. A reinforcing bead structure 64 is provided around the boundary of each slot 63 and added metal at 66 serves to reinforce the walls 61 in the vicinity of the slots 63. The slots 63 cooperate with the slots 46 in the walls 38 of the bottom member B to receive a bar 90 (Fig. 13) for holding the unit in assembled relation. The plate 52 of the top member A is provided with elongated apertures 67 through which implements such as bolts may be removed as hereinafter described and used for holding the friction wedges in retracted positions during assembly. The plate 52 is also provided with holes 68 in the central portion of each load spring engaging area and in general vertical alignment with the apertures 36 in the bottom member B.

The damping mechanism includes two wedges and one is shown in Fig. 2 and the structural features are more clearly illustrated in Figs. 9, 10 and 14. Each wedge is provided with a plate 72 and another plate 73 diverging from the plate 72 in proceeding downwardly on the wedge. The plates 72 and 73 are joined near their upper ends by means of a web 74. The under surface of the web 74 forms an annular seat 76 for the upper end of a wedge actuating spring S (Fig. 2). The surface of the spring seat 76 is perpendicular to a bisector of the angle between the friction faces of the plates 72 and 73. A spring positioning lug 78 formed integral with the web 74 depends therebelow at the central portion of the spring seat 76. The lug 78 is provided with an opening 79 therethrough. The lower end portions of the plates 72 and 73 are joined by spaced tie bars 81. These bars are spaced from each other sufficiently to accommodate the wedge actuating spring S therebetween. The plate 72 of the wedge in its operative position as shown in Fig. 2 is in a substantially vertical plane and is of greater width than other portions of the shoe as will be apparent from a consideration of Fig. 14 to provide an enlarged face for frictionally engaging the surface 59 of one flange 57. The increased width of the plate 72 is accommodated in the zone adjacent the outwardly curved portions 62 of the walls 61. It will be observed that the plate 72 also extends above the web 74 for the purpose of further increasing the facial area of the front plate 72. Two ribs 82 are provided at the top of the wedge as shown in Figs. 9 and 14 which serve to reinforce the shoe and act as abutments for the head of a bolt 88 or the like used in retracting the wedge during assembly of the parts.

In the assembled unit clearance is provided between the side of each wedge W and the associated wall 38 so that the wedge although guided by the walls 38 is free to move laterally of the device to a limited extent and thus accommodate itself to the position of the surface 59 on the top member A. A predetermined clearance is also provided between the outer faces of the walls 38 on the bottom member B and the inner surfaces of the walls 61 on the top member A. The walls 38 are positioned inside the walls 61 and the clearance between the adjacent faces of these walls provides for limited lateral movements between the top member A and the bottom member B to thereby cushion endwise movements of the bolster relative to the side frame when the unit is in service.

The package spring unit and snubbing mechanism may be assembled by first arranging each friction wedge W in a position somewhat as illustrated in Fig. 12 when the wedge actuating spring S is in the extended and uncompressed condition. The spring S is first positioned on its spring seat 47 and the friction shoe is arranged over the upper end of the spring. A horizontal force as represented by the arrow F may be applied to the vertical face on the plate 72 which will result in the compression of the spring S. A bolt 88 may be applied through the hole 79 in the wedge and through the hollow axis of the spring and through the hole in the lug 48. Tightening of a nut 50 on the bolt will serve to hold the friction shoe in a lowered or retracted position and the spring S in a compressed condition if the force F is first utilized in retracting the wedge and compressing the spring. The bolt 88 may be of such length as to move the wedge downwardly and compress the spring S without the necessity of applying a horizontal force to the vertical face of the shoe. Both wedges W are first applied in this manner and are held in retracted positions. Thereafter the load supporting springs 29, and 30 if desired, are mounted with their lower ends in the spring receiving pockets of the bottom member B. The top member A is then arranged over the springs so that the under surface of the top plate 52 in four areas engage the upper ends of the coil springs. The upper ends of the springs are retained in position by means of the depending flange structure 56 and the ribs 55 and the arcuate surfaces 60.

The load supporting springs are partially compressed by moving the top and bottom members toward each other until the slots 63 in the top member and the slots 46 in the walls 38 of the bottom member are in registration. A bar 90 shown in Fig. 13 is then inserted endwise through these aligned slots. Thereafter compression of the wedge actuating springs S is released by removing the bolts 88 through the apertures 67 in the top plate 52. With the bar 90 in place the unit has slightly greater height than when used in railway car trucks with a light load on the bolster. The unit may be shipped with the bar 90 in place. After the spring unit and damping mechanism has been applied to the truck of a railway car the slight additional compression of the load supporting springs will cause the top member A to move downwardly with respect to the bottom member B when the bar 90 may be readily removed from the unit which is then in condition for service.

The load supporting springs resiliently support the load on the side frames of a railway car truck and the wedges W serve to snub or damp recoil of the load springs. It will be noted that the axis of the wedge actuating springs S is in alignment with the bisector of the angle between the plates 72 and 73 and to urge the friction face of the vertical plate 72 of the wedge into frictional engagement with the surface 59 of the top member and the sloping face of the plate 73 into engagement with the surface 43 of the V-shape web structure and thus damp oscillations of the load supporting springs.

While the invention has been described with reference to a top member and a bottom member and with regard to particular structural characteristics it will be appreciated that the assembly may be inverted so that the top member engages the spring seat of a side frame of a truck or the spring plank and that the normal bottom member would engage the under surface of the bolster. The spring group and damping mechanism may be so inverted without altering the operation. In addition changes may be made in the details as well as the general organization. Such changes and modifications and others may be made without departing from the spirit and scope of the invention as set forth in the appended claims.

What I claim and desire to secure by Letters Patent is:

1. In a combined spring group and friction damping device, a bottom member and a superimposed top member, helical load supporting springs having their lower ends seated on the bottom member with upper ends engaging an under surface of the top member, spaced walls extending upwardly from the bottom member at an intermediate portion thereof, a V-shape web structure connecting said walls presenting upwardly diverging under surfaces thereon, flanges depending from the top member opposite said diverging surfaces having substantially vertical inner surfaces, a pair of wedges positioned between said walls each having a sloping face engaging one of said diverging surfaces and a vertical face engaging one of said vertical surfaces, helical springs seated on the bottom member urging the wedges into frictional engagement with said vertical surfaces and said diverging surfaces, the axis of each spring being substantially in alignment with the bisector of an angle between the sloping face and the vertical face of the associated wedge, and said walls under said diverging surfaces forming lateral abutments for said wedges.

2. In a spring group and damping mechanism, superimposed first and second members, helical load supporting springs between said members, spaced transverse walls extending from the first member at an intermediate portion thereof, a horizontally disposed V-shaped web structure connecting said walls presenting surfaces which diverge from each other in proceeding from the first member, flanges extending from the second member at an intermediate portion thereof having substantially vertical inner surfaces of greater width than the space between said transverse walls, a pair of wedges each having a sloping face engaging one of said diverging surfaces and a vertical face of greater width than said sloping face engaging one of said vertical surfaces throughout the width thereof, a helical spring compressed between the first member and one wedge urging it into frictional engagement with said first and second members, and another helical spring compressed between the first member and the other wedge urging it into frictional engagement with said first and second members.

3. A spring group and damping mechanism comprising, superimposed first and second members, vertically disposed helical load supporting springs between said members, spaced transverse walls extending from the second member with end portions thereof flaring from each other, flanges extending from the second member joining ends of said walls and having substantially vertical inner surfaces extending between the flared ends of said walls, spaced transverse walls extending from the first member between intermediate portions of the first walls, a longitudinally extending V-shaped web structure connecting the walls on the first member presenting surfaces which converge towards said vertical surfaces in proceeding from the first member, a pair of wedges each having a sloping surface engaging one of said converging surfaces, a vertical face on each wedge of a width substantially equal to the width of the flanges between said flared ends and engaging one of said vertical surfaces, and helical springs seated on the first member urging the wedges into frictional engagement with said members.

4. A wedge for a combined spring group and damping mechanism comprising, a substantially vertical plate, a second plate diverging from said vertical plate in proceeding towards a base of the wedge with said second plate disposed at an acute angle with respect to the first plate, a web joining an upper end portion of the second plate with an upper portion of the first plate, spaced tie bars joining lower end portions of the first and second plates providing a space therebetween for a wedge actuating spring, a spring seat surface on the under face of said web disposed perpendicular to a bisector of the angle between said plates, said first plate being of greater width than the second plate and extending above the juncture of the web therewith.

5. A wedge for a combined spring group and damping mechanism comprising, a substantially vertical plate, a second plate diverging from said vertical plate in proceeding towards a base of the wedge with said second plate disposed at an acute angle with respect to the first plate, a web joining an upper end portion of the second plate with an upper portion of the first plate, spaced tie bars joining lower end portions of the first and second plates providing a space therebetween for a wedge actuating spring, a spring seat surface on the under face of said web, said first plate being of greater width than the second plate, and said first plate extending above the juncture of the web therewith.

6. A member for a combined damping mechanism and spring group comprising, plate portions forming parts of said member and an intermediate portion joining said plate portions, arcuate flange structures along the perimeters of the plate portions extending substantially at right angles from the planes thereof, spaced transverse walls extending from said intermediate portion, each flange structure having an inwardly curved portion adjacent an end of one of said walls with the curved portion merging with and joining the associated wall, two angular related plates forming a V-shaped web structure disposed generally parallel to said plate portions, said plates extending between said walls with the ends of the plates joining said walls and presenting friction surfaces which diverge in proceeding from said member, transversely spaced spring seats on said intermediate portion, and confronting faces of said walls presenting abutment surfaces at ends of said diverging surfaces.

7. A wedge for a combined spring group and damping mechanism comprising, a first plate, a second plate diverging from said first plate in proceeding towards a base of the wedge with said second plate disposed at an acute angle with respect to the first plate, a web joining an end of the second plate with the first plate, members connecting edges of the first and second plates providing a space therebetween for a wedge actuating spring, a spring seat surface on the inner face of said web, said first plate being of greater width than the second plate, an end portion on said first plate projecting beyond an outer face of said web, and rib means joining said web with said end portion.

8. A wedge for a combined spring group and damping mechanism comprising, a first plate, a second plate diverging from said first plate in proceeding towards a base of the wedge with said second plate disposed at an acute angle with respect to the first plate, a web joining an end of the second plate with the first plate, a spring seat surface on the inner face of said web, an end portion on said first plate projecting beyond the plane of said web, spaced ribs joining said web with said end portion, and said web having an opening therethrough between said ribs.

9. In a spring group and damping mechanism, elongated superimposed first and second members, helical load supporting springs between said members, spaced substantially parallel walls extending from the first member at an intermediate portion thereof and substantially at right angles to the length of said first member, a horizontally disposed V-shaped web structure connecting said walls presenting surfaces which diverge from each other in proceeding from the first member, flanges extending from the second member at an intermediate portion thereof having substantially vertical inner surfaces, a pair of wedges positioned between said transverse walls each having a sloping face engaging one of said diverging surfaces and a vertical face engaging one of said vertical surfaces, a helical spring compressed between the first member and one wedge urging it into frictional engagement with said first and second members, another helical spring compressed between the first member and the other wedge urging it into frictional engagement with said first and second members, said helical springs engaging the first member in areas spaced transversely of the first member, and said walls in areas adjacent ends of said diverging surfaces having confronting faces substantially at right angles to the length of said members forming lateral abutment surfaces for said wedges.

References Cited in the file of this patent

UNITED STATES PATENTS

| | | |
|---|---|---|
| 1,097,975 | Hassler | May 26, 1914 |
| 1,587,116 | Graves | June 1, 1926 |
| 2,352,693 | Davidson | July 4, 1944 |
| 2,398,700 | Edstrom | Apr. 16, 1946 |
| 2,458,210 | Schlegel | Jan. 4, 1949 |
| 2,483,181 | Clasen | Sept. 27, 1949 |
| 2,483,360 | Cottrell | Sept. 27, 1949 |
| 2,527,356 | Cottrell | Oct. 24, 1950 |
| 2,587,392 | Settles et al. | Feb. 26, 1952 |
| 2,627,402 | Smith | Feb. 3, 1953 |
| 2,723,630 | Settles | Nov. 15, 1955 |
| 2,749,113 | Kowalik | June 5, 1956 |
| 2,797,914 | Barber | July 2, 1957 |